US008045211B2

(12) United States Patent  (10) Patent No.: US 8,045,211 B2
Hattori  (45) Date of Patent: Oct. 25, 2011

(54) IMAGE FORMING DEVICE

(75) Inventor: Hiroshi Hattori, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 899 days.

(21) Appl. No.: 12/071,435

(22) Filed: Feb. 21, 2008

(65) Prior Publication Data

US 2008/0198413 A1   Aug. 21, 2008

(30) Foreign Application Priority Data

Feb. 21, 2007  (JP) ................................. 2007-041094

(51) Int. Cl.
*G06K 15/00* (2006.01)
*H04N 1/40* (2006.01)
*H04N 1/00* (2006.01)

(52) U.S. Cl. ........................ 358/1.16; 358/404; 358/444

(58) Field of Classification Search ................. 358/1.15, 358/1.18, 1.16, 2.1, 448, 443, 404, 444
See application file for complete search history.

(56) References Cited

U.S. PATENT DOCUMENTS

| | | | |
|---|---|---|---|
| 5,315,691 | A | 5/1994 | Sumiya et al. |
| 7,523,398 | B2 * | 4/2009 | Watanabe ..................... 715/745 |
| 7,676,512 | B2 * | 3/2010 | Yamamoto et al. ........... 707/608 |
| 7,889,370 | B2 * | 2/2011 | Honda et al. ................. 358/1.15 |
| 2004/0004738 | A1 * | 1/2004 | Ikeda .......................... 358/1.15 |
| 2006/0055975 | A1 | 3/2006 | Toda |
| 2006/0274367 | A1 * | 12/2006 | Yamamoto et al. .......... 358/1.15 |
| 2007/0222802 | A1 * | 9/2007 | Yoshida ........................... 347/5 |
| 2008/0297848 | A1 * | 12/2008 | Mizutani et al. ............. 358/1.16 |

FOREIGN PATENT DOCUMENTS

| | | |
|---|---|---|
| JP | 5-212916 | 8/1993 |
| JP | 5-221092 | 8/1993 |
| JP | 5-224846 | 9/1993 |
| JP | 6-91955 | 4/1994 |
| JP | 6-106813 | 4/1994 |
| JP | 6-270493 | 9/1994 |
| JP | 7-9704 | 1/1995 |

(Continued)

OTHER PUBLICATIONS

Japanese Notification of Reasons of Rejection, with English Translation, Issued in Japanese Patent Application No. JP 2007-041094, dated Feb. 17, 2009. JP Office Action dtd Jun. 2, 2009, JP Appln. 2007-041094.

*Primary Examiner* — Jerome Grant, II

(74) *Attorney, Agent, or Firm* — Banner & Witcoff, Ltd.

(57) ABSTRACT

An image forming device is provided with an external storage, a printing unit, a storage controlling unit configured to store the image data in the external storage or an internal storage. The storage controlling device stores the image data developed from the print data retrieved from the print data stored in the external in the external storage, while stores the image data developed from the print data transmitted from the external device in the internal storage. At least file names of image data stored in the external storage on the displaying unit are displayed for selection when the external storage is connected to the image forming device, and file names of image data stored in the internal storage are displayed when the external storage is not connected to the image forming device. A reprinting unit performs a reprinting operation based on the selected image data.

13 Claims, 9 Drawing Sheets

FOREIGN PATENT DOCUMENTS

| | | |
|---|---|---|
| JP | 11-053520 | 2/1999 |
| JP | 2001-80173 A | 3/2001 |
| JP | 2001-157011 | 6/2001 |
| JP | 2004-74423 A | 3/2004 |
| JP | 2005-103867 | 4/2005 |
| JP | 2006-76215 | 3/2006 |
| JP | 2006-142615 A | 6/2006 |
| JP | 2006-218732 A | 8/2006 |

* cited by examiner

FIG.7A
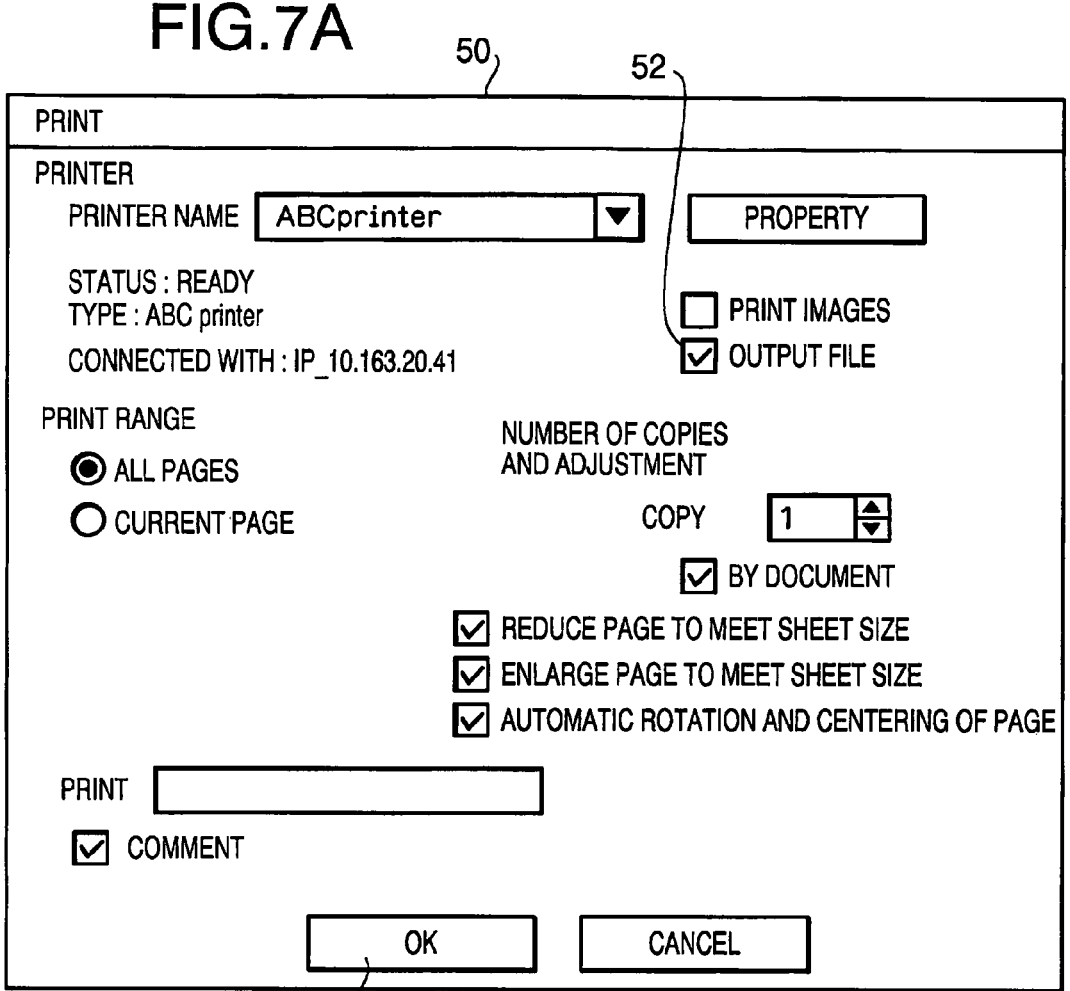
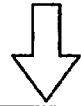
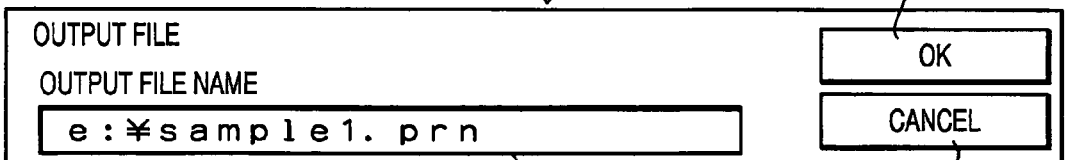
FIG.7B

IMAGE FORMING DEVICE

CROSS-REFERENCE TO RELATED APPLICATION

This application claims priority under 35 U.S.C. §119 from Japanese Patent Application No. 2007-041094 filed on Feb. 21, 2007. The entire subject matter of the application is incorporated herein by reference.

BACKGROUND

1. Technical Field

The following description relates to an image forming device capable of performing a direct printing for retrieving print data stored in detachably attached external storage and printing images based on the retrieved print data.

2. Related Art

Conventionally, there is known an image forming device capable of performing the direct printing. The direct printing is a function of retrieving print data stored in the external storage detachably attached to the image forming device, developing image data (e.g., generating bitmap data), and printing images on recording sheets based on the developed image data. Examples of such an image forming device are disclosed in Japanese Patent Provisional Publications No. 2006-76215, No. 2005-103867 and No. HEI 7-9704.

In the image forming device as disclosed in the publications indicated above, when the print data is developed, the developed image data is stored in the external storage such as a USB memory. By storing the image data in the external storage, and retain the same therein, when the image is reprinted, the stored image data can be used, thereby shortening a waiting time in comparison with a case where the image data is developed again from the print data.

When the print data requires security protection, and security is to be ensured, the above configuration is convenient since the image data is stored in the external storage, by removing the external storage, a third party cannot access and print the image data. Image data which need not be secured may be stored in an internal storage such as an HDD (Hard Disk Drive) or the like.

SUMMARY OF THE INVENTION

As above, if the image data is stored in the external storage, simply by removing the external storage from the image forming device, the confidentiality is preserved. However, when reprinting is necessary, it is relatively difficult to designate images to be printed. For example, a plurality of pieces of image data is stored in the external storage, or such data is stored in the HDD or built-in memory, it is sometimes troublesome to find the images to be printed. Thus, even if the data is stored as the image data, the waiting time may not be shortened.

In consideration of the above problem, the present invention is advantageous in that an improved image forming device is provided, with which reprinting operation can be done relatively easy with preserving the confidentiality.

According to aspects of the invention, there is provided an image forming device to which an external storage is detachably connectable, which is provided with a printing unit configured to print an image on a recording sheet based on image data developed from the print data which is retrieved from the external storage connected to the image forming device, a storage controlling unit configured to control storing of the image data in the external storage connected to the image forming device and an internal storage which is provided to the image forming device, in the external storage, a displaying unit configured to display information, a selection unit configured to allow a user to select image data, and a reprinting unit configured to perform a reprinting operation based on image data selected with the selection unit. The storage controller stores the image data developed from the print data, which is retrieved from the print data retrieved from the print data stored in the external storage, in the external storage when connected to the image forming device, The selecting unit selectably displays at least file names of image data stored in the external storage on the displaying unit when the external storage is connected to the image forming device. Further, the selecting unit selectably displays file names of image data stored in the internal storage on the displaying unit when the external storage is not connected to the image forming device, With the above configuration, since the image data developed from the print data stored in the external storage is also stored in the external storage. Therefore, security protection can be achieved. Further, for reprinting, when the external storage is connected to the image forming device, the file names of the image data stored in the external storage are displayed for selection, while the file names of the image data stored in the HDD are displayed when the external storage is not connected to the image forming device. Therefore, the user can select the images to be printed relatively easily.

According to aspects of the invention, there is provided a method of executing a reprinting operation for an image forming device provided with an internal storage, an external storage which is detachably connectable to the image forming device, a display unit, and a printing unit configured to print an image on a recording sheet based on image data developed from the print data which is retrieved from the external storage or transmitted from an external device. The method includes the steps of (a) storing the image data developed from the print data retrieved from the print data, which is stored in the external storage, in the external storage, (b) storing the image data developed from the print data, which is transmitted from the external device, in the internal storage, (c) selectably displaying at least file names of image data stored in the external storage on the displaying unit when the external storage is connected to the image forming device, (d) selectably displaying file names of image data stored in the internal storage on the displaying unit when the external storage is not connected to the image forming device, and (e) executing the reprinting operation based on the selected image data.

According to further aspects of the invention, there is provided a computer accessible medium comprising computer readable instructions stored thereon, which cause an image forming device provided with an internal storage, an external storage which is detachably connectable to the image forming device, a display unit, and a printing unit configured to print an image on a recording sheet based on image data developed from the print data which is retrieved from the external storage or transmitted from an external device to execute the steps of (a) storing the image data developed from the print data retrieved from the print data, which is stored in the external storage, in the external storage, (b) storing the image data developed from the print data, which is transmitted from the external device, in the internal storage, (c) selectably displaying at least file names of image data stored in the external storage on the displaying unit when the external storage is connected to the image forming device, (d) selectably displaying file names of image data stored in the internal storage on the displaying unit when the external storage is not connected to the image forming device, and (e) executing the reprinting operation based on the selected image data.

BRIEF DESCRIPTION OF THE ACCOMPANYING DRAWINGS

FIGS. 7A and 7B show example of dialog boxes used for a print menu.

DETAILED DESCRIPTION OF THE EMBODIMENT

Hereinafter, referring to the accompanying drawings, embodiments according to the invention will be described in detail.

Figure 1:
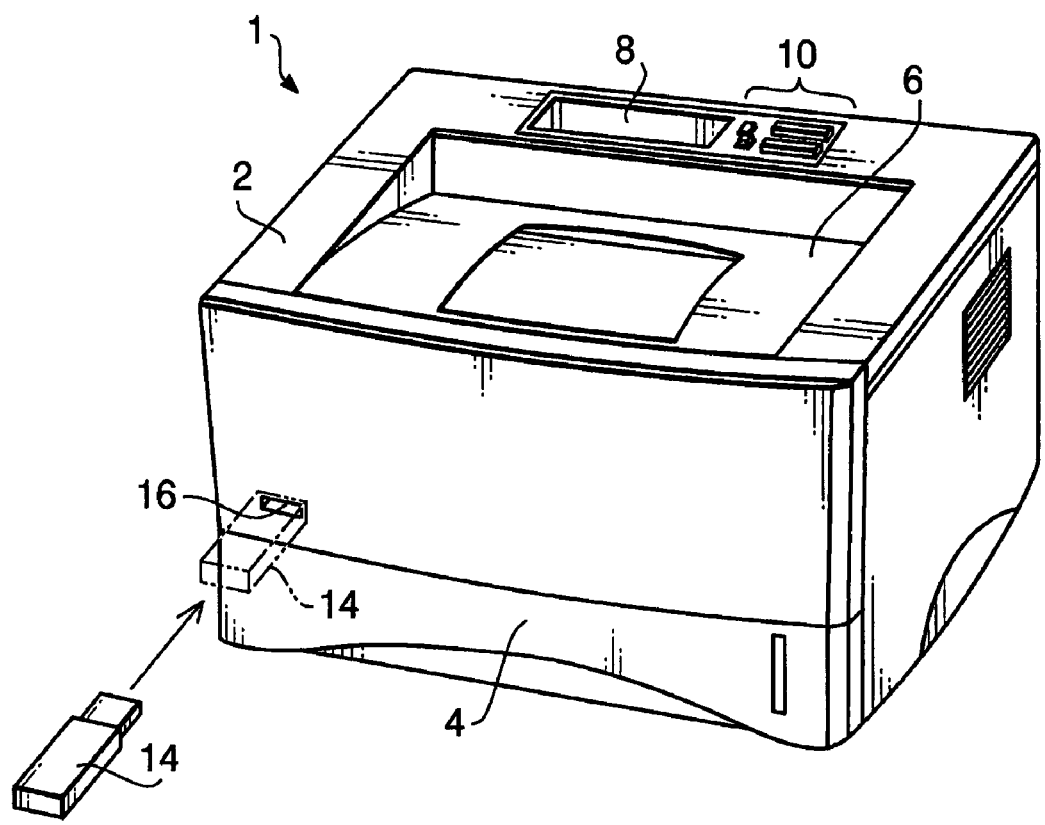
FIG. 1 is a perspective view of an image forming device according to an aspect of the invention.

FIG. 1 is a perspective view showing an appearance of an image forming device 1 according to embodiment of the invention. As shown in FIG. 1, the image forming device 1 is provided with a main body 2, and a sheet cassette 4 for accommodating a stack of recording sheets, which is provided at a lower part of the main body 2 such that the sheet cassette 4 can be drew from the main body 2. At an upper portion of the main body 2, a sheet discharge tray section 6 for receiving the discharged recording sheets on which images are printed. The image forming device 1 is further provided with a displaying unit 8 including an LCD (Liquid Crystal Display), an operation unit 10 allowing a user to input various commands using operation keys provided thereto. The main body 2 is formed with an insertion slot 16, in which an external storage 14 such as a USB memory is removably inserted.

Figure 2:
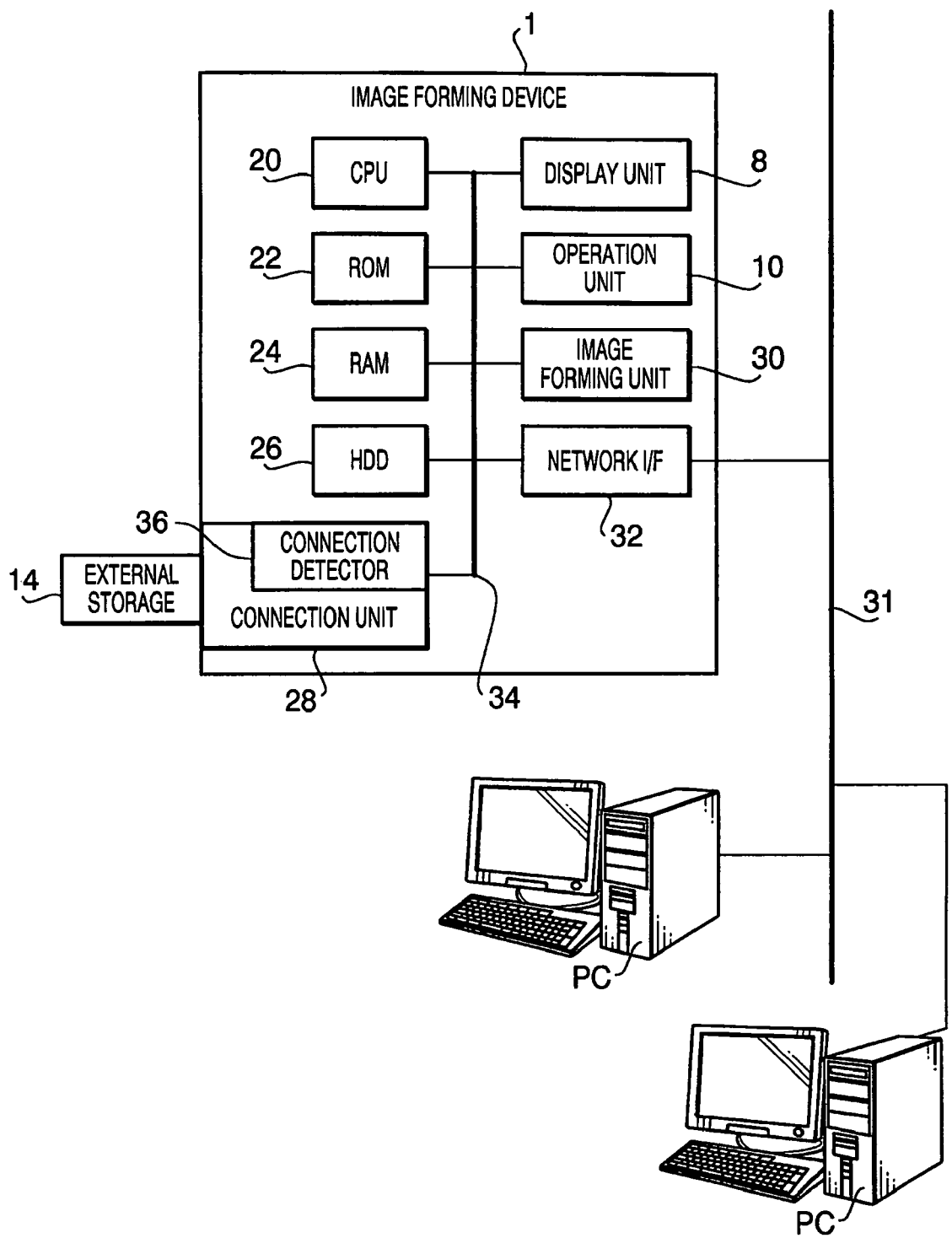
FIG. 2 is a block diagram showing an electrical configuration of the image forming device according to aspects of the invention.

FIG. 2 is a block diagram showing an electrical configuration of the image forming device 1. The image forming device 1 is provided with a CPU (Central Processing Unit) 20 which executes programs to control operation of the image forming device 1, a ROM (Read Only Memory) 22 storing various programs to be executed by the CPU 20, a RAM (Random Access Memory) 24 which temporarily stores data such as processing results, an HDD (Hard Disk Drive) 26 which stores various data. The image forming device 1 further includes a connecting unit 28 to which the external storage 14 is connected, the displaying unit 8, the operation unit 10, an image forming unit 30 which is controlled by the CPU 20 based on the programs and forms images on the recording sheets, and a network interface 32 which is configured to connect the image forming device 1 to external devices such as a PC (Personal Computer) or the like through a network 31 such as a LAN (Local Area Network). The above-described units are interconnected through a bus 34 such that data can be exchanged thereamong.

The connecting unit 28 is provided with a connection detecting unit 36 which has a well-known configuration for detecting connection/disconnection of the external storage 14 by monitoring signal level of a terminal, which is in a disconnected status when the external storage 14 is not connected to the connecting unit 18, while in a connected status when the external storage 14 is connected to the connecting unit 28.

According to the exemplary embodiment, the external storage 14 is a stick-type USB (Universal Serial Bus) memory provided with a non-volatile rewritable memory. The USB memory can be removably connected to the image forming device 1, that is, the external storage 14 can be removably connected to the connecting unit 28. It should be noted that the external storage 14 need not be the USB memory, but any medium which can be removably connected to the image forming device 1 and data can be retrieved therefrom or written therein. Thus, alternatively or optionally, a floppy Disk®, an external hard disk, magneto-optical disc drive, or a non-volatile memory card can be used as the external storage 14.

The printing operation is executed in accordance with a well-known electrophotographic imaging process. That is, a laser beam is ON/OFF modulated based on the image data and scanned within a predetermined angular range so that the surface of a photoreceptive drum, which is rotated, is scanned by the modulated laser beam (not shown) to form an electrostatic latent image. The latent image is then developed as toner is applied thereto, thereby a toner image is formed. The toner image is transferred onto a recording sheet which is fed from the sheet feed cassette 4. The toner image transferred on the recording sheet is fixed on the recording sheet, which is discharged and stacked on the tray section 6. As described above, the image forming unit 30 is configured as a so-called page printer, which forms a page of the image (toner image) on one page of the recording sheet. It should be noted that the invention need not be limited to this configuration (i.e., the electrophotographic imaging device), but can be of other types such as an inkjet type serial printer (i.e., not a page printer).

The image forming device 1 generates the image data by developing print data, which is transmitted from an external PC via the network interface 32 and/or stored in the external storage 14, or a frame memory inside the RAM 24. The image data thus developed in the frame memory of the RAM 24 is transmitted to the image forming unit 30 as CMYK (Cyan, Magenta, Yellow and Black) data or K data (in case of greyscale image). The image forming unit 30 prints images represented by the image data on the recording sheet. The printing operation may be color printing or monochromatic printing.

The print data is, for example, PDL (Page Description Language) data or a predetermined printable format such as PDF, TIFF, or JPEG format data.

Figure 3:
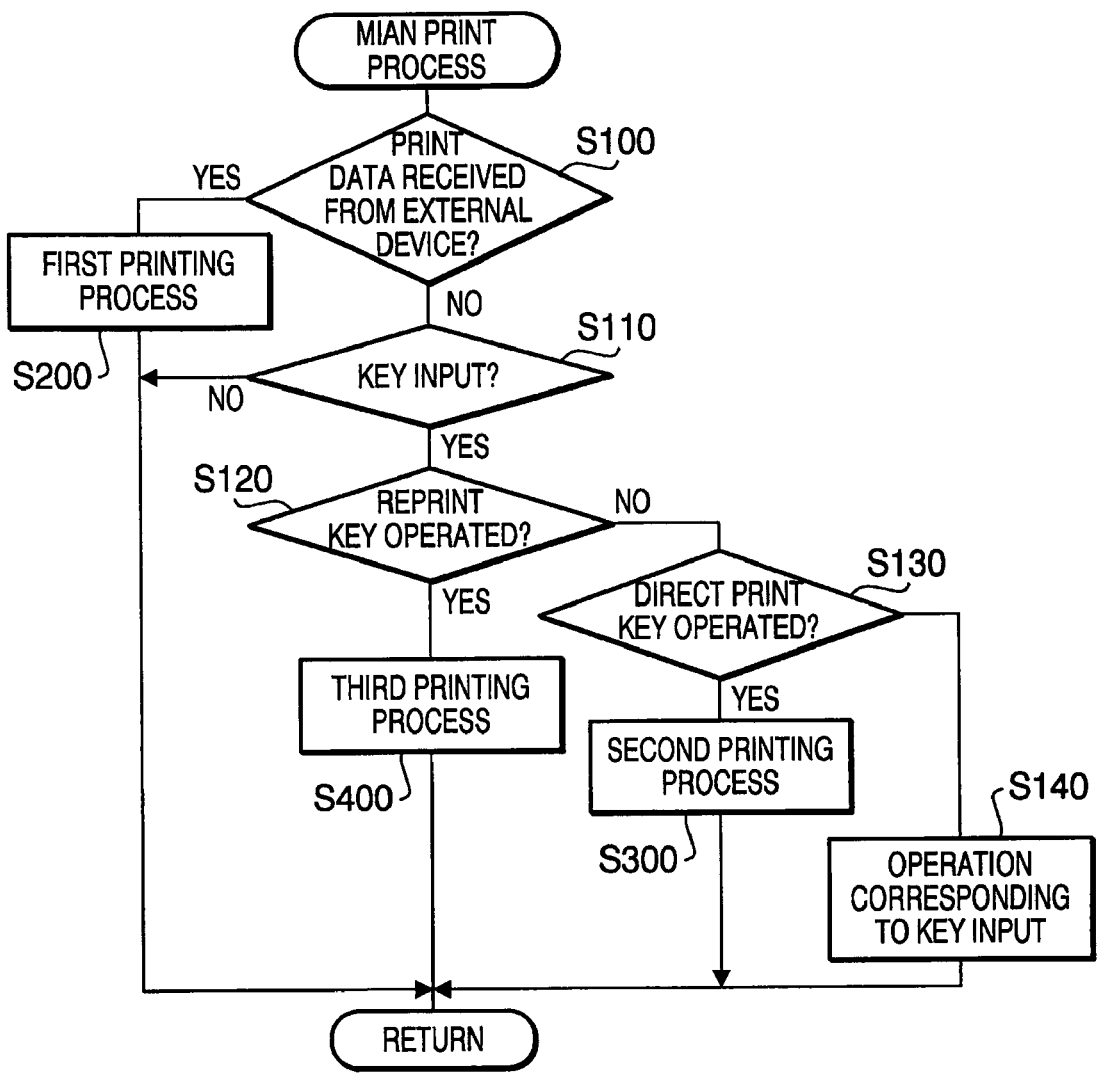
FIG. 3 is flowchart illustrating a print process according to aspects of the invention.

Next, printing process performed by the image forming device 1 will be described, referring to flowcharts. FIG. 3 is a flowchart illustrating the main printing process according to the embodiment.

When the main printing process starts, in S100, the process judges whether print data is received from the external PC via the network interface 32. If the process determines that the print data is received via the network interface 32 (S100: YES), the process executes a first print process (S200) which is a printing process based on the print data received via the network interface 32. Then, process returns to S100.

If the process determines that no print data is received via the network interface 32 (S100: NO), the process judges whether one of the operation keys of the operation unit 100 is operated (S110). If the process determines that none of the operation key is operated (S110: NO), the process returns to S100. If the process determines that one of the operation key is operated (S110: YES), the process judges whether the operated key is a re-print key (S120).

If the operated key is not the re-print key (S120: NO), the process judges whether the operated key is a direct print key (S130). If the operated key is not the direct print key (S130: NO), the process executes an operation corresponding to an operated key (S140). Thereafter, the process repeats the main printing process shown in FIG. 3 from the beginning.

If the process determines that the operated key is the direct print key (S130: YES), the process executes a second printing process (S300) which is a so-called direct printing process for printing images based on the print data stored in the external storage 14. Thereafter, the process repeats the main printing process shown in FIG. 3 from the beginning.

If the process determines that the operated key is the re-print key (S120: YES), the process executes a third printing process (S400) which is a reprinting process for reprinting the image data once printed. Thereafter, the process repeats the main printing process shown in FIG. 3 from the beginning.

Figure 4:
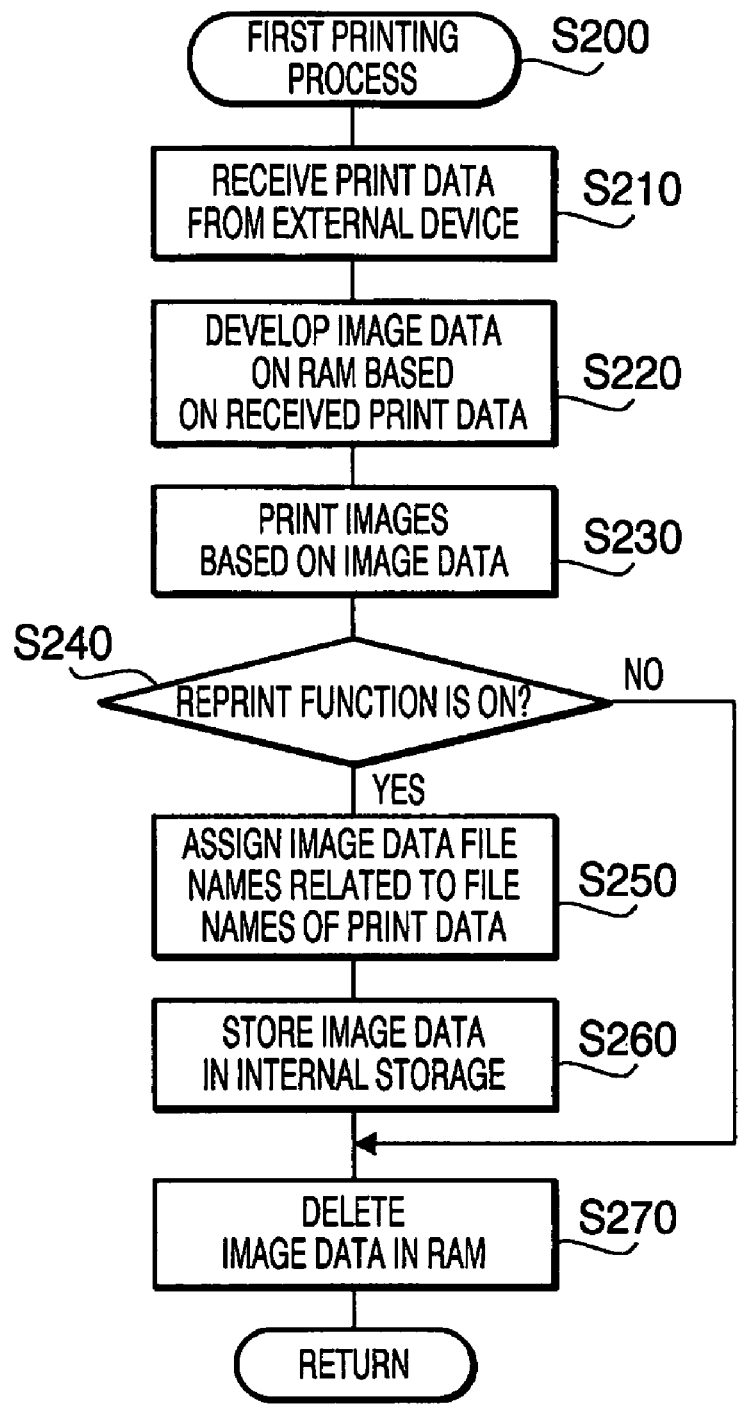
FIG. 4 is a flowchart illustrating a print process using the external device.

FIG. 4 is a flowchart illustrating an example of the first printing process, which is called in S200 of the main printing process shown in FIG. 3.

When the print data is transmitted from the external PC, as shown in FIG. 4, the process receives that print data from the external device (S210), and stores the received print data in the HDD 26. It should be noted that the received data may be stored in another storage device such as the RAM 24 instead of the HDD 26. Then, the process rasterizes the print data and develops bitmap image data in the frame memory inside the RAM 24 (i.e., the image data is generated) in S220.

After developing the image data, the process controls the image forming unit 30 based on the image data to print an image on the recording sheet (S230). After printing the image, the process judges whether the reprint function is ON (S240).

It should be noted that, if the reprint function is ON when the image data is developed from the print data for printing, and if the same image is to be printed again, the developed image data is used without executing a developing step for generating the image data from the print data, thereby saving time for preparing the image data used for reprinting.

The reprinting function is turned ON or OFF by the user with operating the operation unit 10. If the process determines that the reprinting function is ON (S240: YES), the process assigns a file name, which related to the file name of the original print data (e.g., document1.pdf) received in S210, to the image data (e.g., the file name of the image data may be document1-pdf.dat) in S250.

Then, in S260, the process stores the image data developed in the frame memory inside the RAM 24 in the HDD 26 with the name assigned in S250. Incidentally, the storage for storing the image data in S260 need not by limited to the HDD 26, but another memory such as the non-volatile memory or RAM memory provided to the image forming device 1 can be used.

After storing the image data in the HDD 26 in S260, the process deletes the image data in the RAM 24 (S270). Then, the process returns to and repeats the main printing process shown in FIG. 3.

If the process determines that the reprinting function is OFF (S240: NO), the process skips S250 and S260 (therefore, the process does not store the image data in the HDD 26), and deletes the image data stored in the RAM 24. Then, the process returns to and repeats the main printing process shown in FIG. 3.

Figure 5:
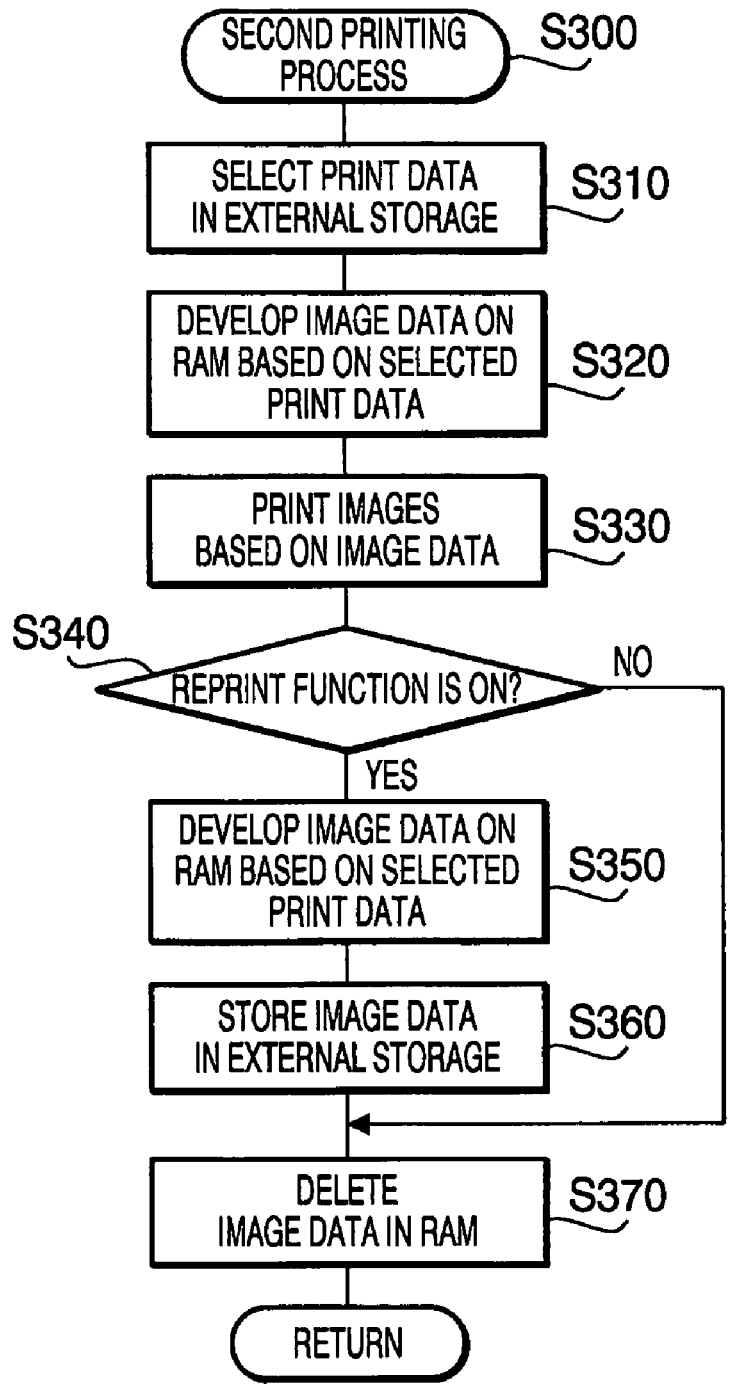
FIG. 5 is a flowchart illustrating a direct print process according to aspects of the invention.

FIG. 5 is a flowchart illustrating an example of the second printing process (direct printing process) which is called in S300 of the main printing process shown in FIG. 3. If the process determines that the direct print key is operated (FIG. 3, S130: YES), the second printing process is executed. It should be noted that, before the second printing process is executed, the print data should be stored in the external storage 14 in advance.

Storing the print data in the external storage 14 is done by the external device (PC) when the external storage 14 is connected to the external device (PC). For example, when application software such as a word processing application, a spreadsheet application, an image processing application or the like installed in the external device is executed, if a print menu of the application is selected by the user, a dialog box as shown in FIG. 7A is displayed on the display of the external device (PC).

If a check box 52 for output to a file is checked and an OK button 54 is clicked, another dialog box 56, shown in FIG. 7B, requiring the user to designate a destination of output (i.e., image data). If the external device 14 is referred to as an E drive of the PC 14, and the output file is to be stored in the external device 14, the user may input, for example, a name, "e:¥sample1.pm" and click the OK button 60.

Then, the print data of which name is "sample1.pm" is stored in the external storage 14. The print data file is the PDL data file or a file suitable to the direct print (e.g., PDF, TIFF, JPEG, etc.).

That is, after creating text data, spreadsheet data etc. with applications (word processing application, spreadsheet application, etc.) of an external PC, the user may select a print menu of the application, and selects printing. Then, the text data, spreadsheet data, etc. are converted into the PDL data by the printer driver software. The thus converted PDL data is stored in the external storage 14 as described above. It should be noted that the external PC may not be connected to the image forming device 1 through the network 31.

The PDF is a file format developed by Adobe system and widely used format. The PDF contains not only text, image information, but layout information, font information and the like and enables the direct printing without relying on an application. Further, the image file formats such as the TIFF format and JPEG format can be used as the data file format and are stored as they are when the print data is stored in the external device 14. If the image forming device 1 is implemented with font data, a so-called text type print data can also be subject to the direct printing. Therefore, in such case, the print data of a TXT format may be stored in the external storage 14.

When the print data is stored in the external storage 14, without the external PC, images represented by the print data can be printed by the image forming device 1 capable of executing the direct printing. That is, for printing images represented by the print data stored in the external storage 14, the user may remove the external storage 14 from the external PC, and connects the external storage 14 to the image forming device 1.

When the user operates the direct print key of the image forming device 1 when the external storage 14 is connected to the image forming device 1, the second printing process (i.e., the direct printing process) shown in FIG. 5 is executed.

When the second printing process is started, the process requires the user to select the print data to be printed (S310).

Figure 8:
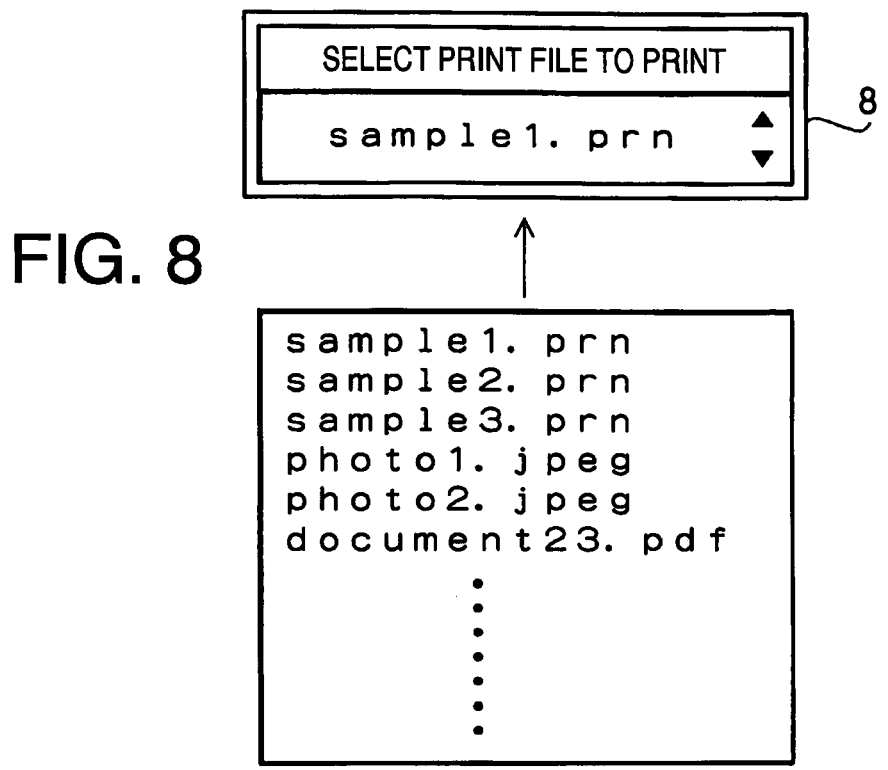
FIG. 8 shows an example of displayed screen when a print file is selected.

According to the exemplary embodiment, one or two print data files of all the print data stored in the external storage 14 are displayed on the display unit 8 at a time as shown in FIG. 8. The user can select a file by scrolling the list displayed on the display unit 8 and depressing an execution key of the operation unit 10. If a display area of the display unit 8 is sufficiently large, more than two print files may be displayed in the display area of the display unit 8. In such a case, one of the displayed files may be highlighted with cursor keys or the like, and the execution key may be depressed to print the highlighted file.

Next, the process rasterizes the selected print data and develops bitmap data in the frame memory inside the RAM 42 to generates the image data (S320). After developing the image data, the process controls the image forming unit 30, based on the image data thus generated, to print the image on the recording sheet (S330). After printing, the process judges whether the reprint function is ON (S340).

If the reprint function is ON (S340: YES), the process assigns a file name (e.g., sample1-prn.dat), which is related to the file name (e.g., sample1.prn), to the image data (S350). Then, in S360, the process stores the image data, which is developed in the frame memory in the RAM 24, in the external storage 14 with the name assigned thereto in S350 (e.g., sample1-prn.data).

After storing the image data in the external storage 14, the process deletes the image data inside the RAM 24 (S370), returns to the main printing process shown in FIG. 3, and repeats steps S100 onwards. If the process determines that the reprint function is OFF (S340: NO), the process skips S350 and S360, stops storing the image data in the external storage 14, returns to the main printing process in FIG. 3, and repeats steps S100 onwards.

Figure 6:
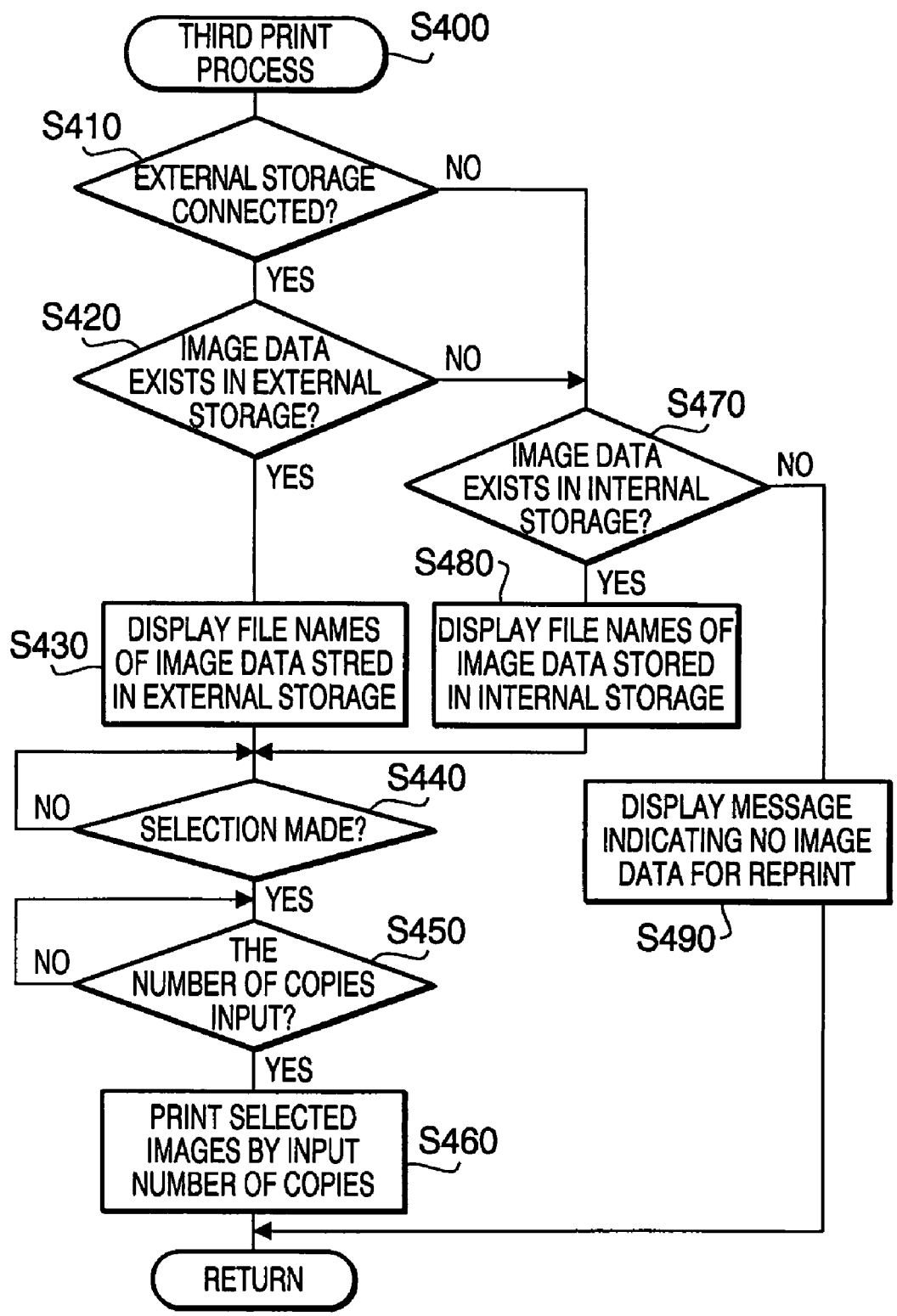
FIG. 6 is a flowchart illustrating a reprint process.

Next, the third printing process (i.e., reprinting process) will be described. FIG. 6 is a flowchart illustrating an example of the reprinting process according to the embodiment. The third printing process is started when the process determines that the reprint key is operated (S120: YES).

In the third printing process, firstly the process judges whether the external storage 14 is connected to the connection unit 28 (S410). Whether the external storage 14 is connected or not is judged based on the detection result of the connection detecting unit 36. If the connection detecting unit 36 detects that the external storage 14 is connected (S410: YES), the process judges whether the image data is stored in the external storage 14 (S420). Whether the image data is stored or not is judged, for example, based on whether file names of the data stored in the external storage 14 have predetermined extensions (e.g., "dat").

If the process determines that the image data is stored in the external storage 14 (S420: YES), the process displays file names of the image data on the display unit 8 (S430). Then, the process judges whether an image to be printed (i.e., one of the file names) is selected from the file names, which correspond to the images, displayed on the display unit 8 (S440).

Figure 9:
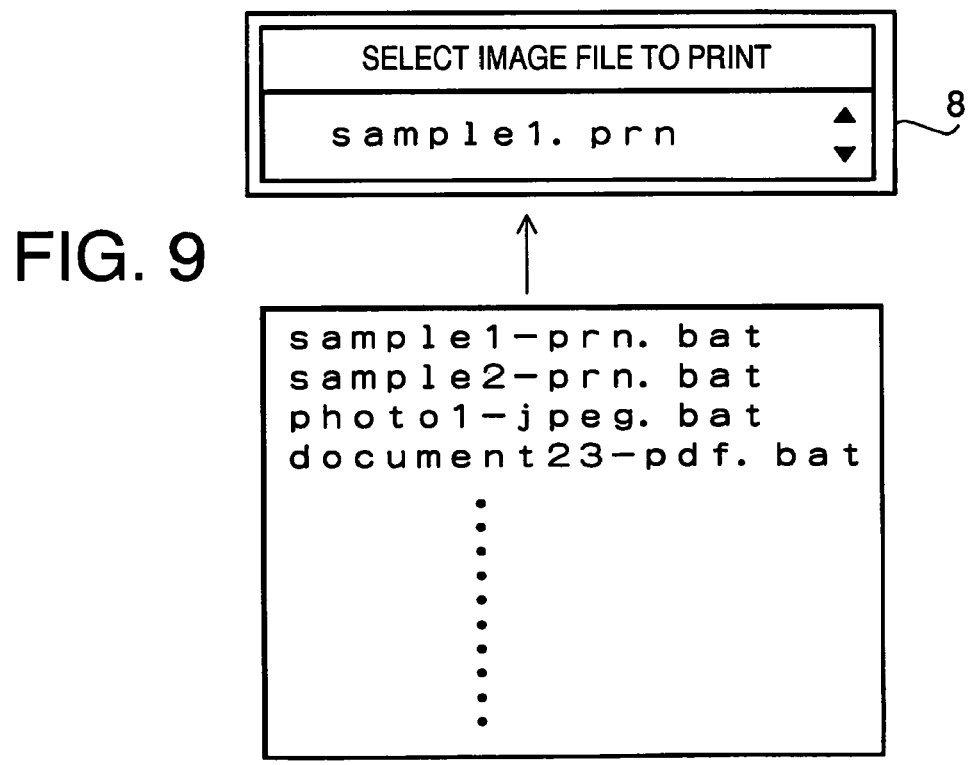
FIG. 9 shows an example of displayed screen when a print file is selected.

According to the embodiment, display and selection of the image data (i.e., a file name if the image data) is performed as follows. Firstly, the process displays the files stored in the external storage 14 such that one or two file names of the image data files stored in the external storage 14 (which are indicated as a list in a box drawn with dotted lines in FIG. 9) are displayed at a time on the display unit 8, allowing a user to scroll the list and select a file. The selection of the file is done by depressing an execution key of the operation unit 10 by the user. It should be noted that, if the display area of the display unit 8 is larger so that more number of files can be displayed, the number of files displayed at a time need not be limited to two, and more number of files may be displayed on the display unit 8.

The process pauses until a file name is selected (S440: YES), then, the process judges whether the number of copies a printout has been input (S450). The number of copies can be input through the operation panel 10. If the number of copies is input (S450: YES), the process controls the image forming unit 30 to print the images represented by the image data by the number of copies as input (S460).

If the connection detecting unit 36 detects that the external storage 14 is not connected (S410: NO), or if no image data is stored in the external storage 14 (S420: NO), the process judges whether image data is stored in the hard disk 26 (internal memory) (S470).

Whether image data is stored in the hard disk or not is detected, for example, based on the extensions of the file names stored in the hard disk 26, of based on whether there exists a file in predetermined folder that is specified to store the image data.

If the process judges that there exists image data (S470: YES), the process displays the image data stored in the HDD 26 on the display unit 8 similarly to S430 (S480). After execution of S480, the process executes steps S440-S460 and prints images represented by the image data on the recording sheets by the number of copies as input, similarly to a case where the image data stored in the external storage 14 is printed. If the process judges that there is no image data stored in the HDD 26 (S470: NO), the process displays a message that no image data for reprinting is stored (S490).

After printing images represented by the image data on the recording sheet (S460) or after displaying the message (S490), the process returns to the main printing process shown in FIG. 3, and repeats steps S100 onwards.

As described above, the image data developed from the print data stored in the external storage 14 is stored in the same external storage 14 which stores the print data, and the image data developed from the print data which is transmitted from the external PC is stored in the HDD (i.e., internal storage) 26.

Since, data requiring security protection is stored in the external storage 14, by removing the external storage 14 from the image forming device 1, the data requiring security protection is not retained in the image forming device 1 and the security protection is achieved. Further, when the external storage 14 is connected to the image forming device 1, the file names of the image data stored in the external storage 14 are displayed so that the user select images to be printed, and if there is no data stored in the connected external storage 14 or if the external storage 14 is not connected to the image forming device 1, the file names of the image data stored in the hard disk 26 are displayed for selection, reprinting operation can be done easily.

Since only the file names of the image data stored in the external storage 14 are displayed when the external storage 14 is connected to the image forming device 1, the user can easily select the image data to be reprinted. Further, the file name of the image data is related to the file name of the print data, a desired image data can be selected easily. Furthermore, by enabling/disabling the reprinting function, storing of the image data can be permitted/inhibited easily. Therefore, by disabling the storing function, unnecessary image data will not be stored in the external storage 14 and/or the image data will not be unintentionally stored in the external storage 14.

Figure 10:
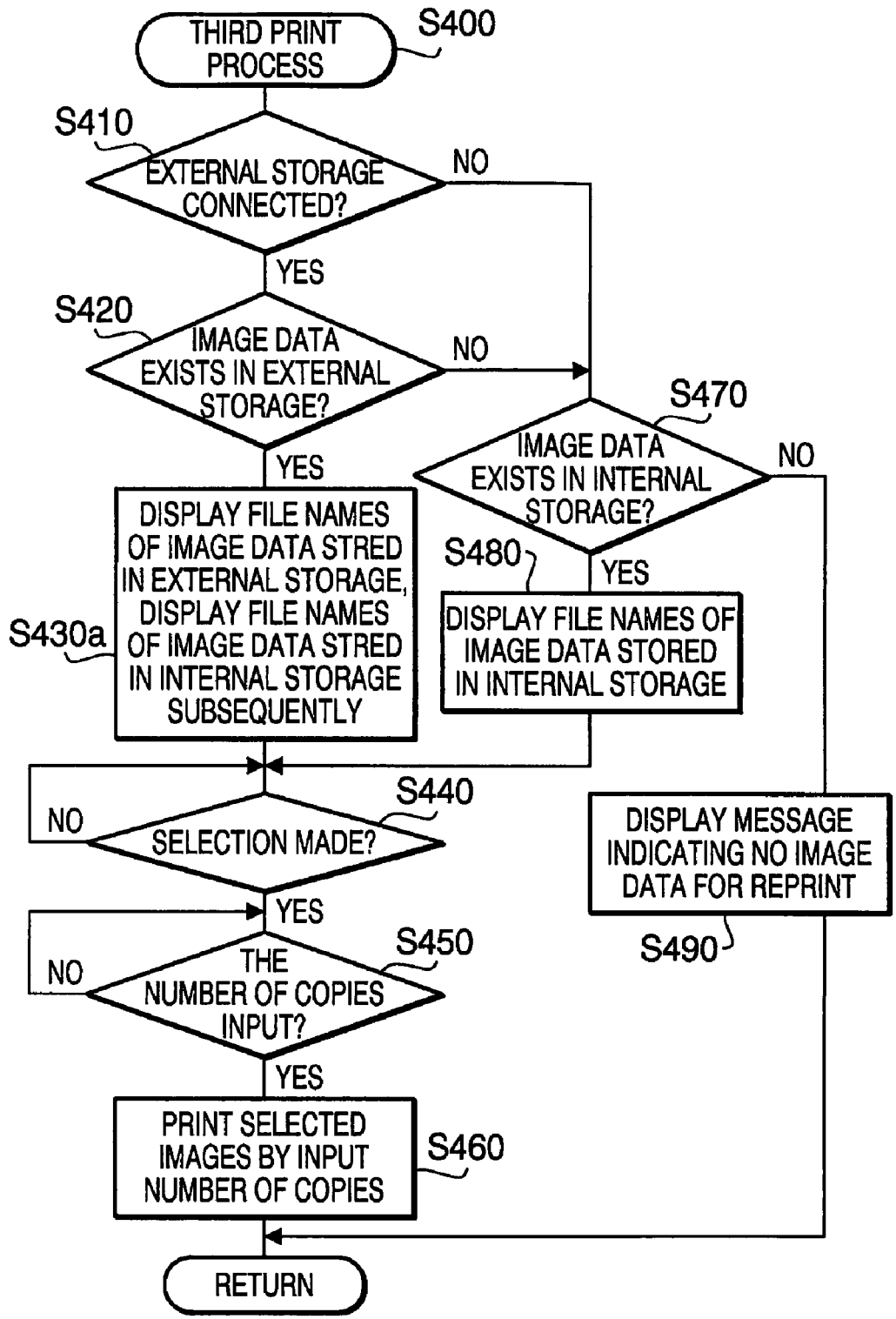
FIG. 10 is a flowchart illustrating a reprint process according to aspects of a second embodiment.

Next, a modified third printing process according to a second embodiment will be described. FIG. 10 is a flowchart illustrating an example of the third printing process according to the second embodiment. In FIG. 10, steps similar to those in FIG. 6 are indicated by the same step numbers and description thereof will be omitted for brevity.

As shown in FIG. 10, according to the second embodiment, S430 of FIG. 6 is changed to S430a. In S430a, file names of the image data stored in the external storage 14 are displayed first, and then file names of the image data stored in the internal storage (i.e., hard disk) 26 are displayed subsequently. Similar to the first embodiment, the file names are displayed on the display unit 8 such that one or two file names are displayed at a time, and the list of the file names can be scrolled.

According to the second embodiment, when the external storage 14 is connected to the image forming device 1, the image data stored in both of the external storage 14 and the hard disk 26 can be displayed subsequently by scrolling the file names displayed on the display unit 8, desired image data can be found easily.

It should be noted that the invention need not be limited to the above-described exemplary embodiments, but various modification can be made without departing from the scope of the invention.

What is claimed is:

1. An image forming device to which an external storage is detachably connectable, comprising:
    a printing unit configured to print an image on a recording sheet based on image data developed from the print data which is retrieved from the external storage connected to the image forming device;
    a displaying unit configured to display information;
    a processing unit; and
    memory storing computer-executable instructions thereon, which when executed by the processing unit, cause the processing unit to operate as
        a storage controlling unit configured to control storing of the image data in the external storage connected to the image forming device and an internal storage which is provided to the image forming device, in the external storage;
        a selection unit configured to allow a user to select image data; and
        a reprinting unit configured to perform a reprinting operation based on image data selected with the selection unit,
    wherein the storage controller stores the image data developed from the print data, which is retrieved from the print data stored in the external storage, in the external storage when connected to the image forming device;
    wherein the selection unit selectably displays at least file names of image data stored in the external storage on the displaying unit when the external storage is connected to the image forming device, and
    wherein the selection unit selectably displays file names of image data stored in the internal storage on the displaying unit when the external storage is not connected to the image forming device.

2. The image forming device according to claim 1, wherein the selection unit displays only the file names of the image data stored in the external storage when the external storage is connected to the image forming device.

3. The image forming device according to claim 1, wherein the selection unit displays both the names of the image data stored in the external storage and the file names of the image data stored in the internal storage when the external storage is connected to the image forming device.

4. The image forming device according to claim 1, wherein the storage controlling unit stores the image data such that the file names of the image data as stored are related to file names of the print data from which the image data is developed, respectively.

5. The image forming device according to claim 1, wherein the storage controlling unit is configured to be disabled so that the image data is not stored.

6. A method of executing a reprinting operation for an image forming device provided with an internal storage, an external storage being detachably connectable to the image forming device, a display unit, and a printing unit configured to print an image on a recording sheet based on image data developed from print data which is retrieved from the external storage or transmitted from an external device, comprising the steps of:
    storing the image data developed from the print data, which is retrieved from in the external storage, in the external storage;
    storing the image data developed from the print data, which is transmitted from the external device, in the internal storage;
    selectably displaying at least file names of image data stored in the external storage on the displaying unit when the external storage is connected to the image forming device;
    selectably displaying file names of image data stored in the internal storage on the displaying unit when the external storage is not connected to the image forming device; and
    executing the reprinting operation based on the selected image data.

7. The method according to claim 6, wherein only the file names of the image data stored in the external storage are displayed when the external storage is connected to the image forming device.

8. The method according to claim 6, wherein both the names of the image data stored in the external storage and the file names of the image data stored in the internal storage are displayed when the external storage is connected to the image forming device.

9. The method according to claim 6, wherein the step of storing stores the image data such that the file names of the image data as stored are related to file names of the print data from which the image data is developed, respectively.

10. A non-transitory computer accessible medium comprising computer readable instructions stored thereon, which when executed by a computer, cause an image forming device provided with an internal storage, an external storage which is detachably connectable to the image forming device, a display unit, and a printing unit configured to print an image on a recording sheet based on image data developed from print data which is retrieved from the external storage or transmitted from an external device to execute the steps of:
    storing the image data developed from the print data, which is retrieved from the external storage, in the external storage;
    storing the image data developed from the print data, which is transmitted from the external device, in the internal storage;

selectably displaying at least file names of image data stored in the external storage on the displaying unit when the external storage is connected to the image forming device;

selectably displaying file names of image data stored in the internal storage on the displaying unit when the external storage is not connected to the image forming device; and executing the reprinting operation based on the selected image data.

11. The computer accessible medium according to claim 10, wherein only the file names of the image data stored in the external storage are displayed when the external storage is connected to the image forming device.

12. The computer accessible medium according to claim 10, wherein both the names of the image data stored in the external storage and the file names of the image data stored in the internal storage are displayed when the external storage is connected to the image forming device.

13. The computer accessible medium according to claim 10, wherein the step of storing stores the image data such that the file names of the image data as stored are related to file names of the print data from which the image data is developed, respectively.

* * * * *